(12) United States Patent
Guo (10) Patent No.: US 12,547,123 B2
(45) Date of Patent: *Feb. 10, 2026

(54) ELECTRONIC DEVICE AND CONTROL METHOD

(71) Applicant: VIVO MOBILE COMMUNICATION CO., LTD., Dongguan (CN)

(72) Inventor: Yuanming Guo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 603 days.

This patent is subject to a terminal disclaimer.

(21) Appl. No.: 17/896,040

(22) Filed: Aug. 25, 2022

(65) Prior Publication Data

US 2022/0413448 A1 Dec. 29, 2022

Related U.S. Application Data

(63) Continuation of application No. PCT/CN2021/077436, filed on Feb. 23, 2021.

(30) Foreign Application Priority Data

Feb. 27, 2020 (CN) .......................... 202010124600.4

(51) Int. Cl.
*G04G 17/06* (2006.01)
*G04G 17/04* (2006.01)
(Continued)

(52) U.S. Cl.
CPC ........... *G04G 17/06* (2013.01); *G04G 17/045* (2013.01); *G04G 17/08* (2013.01); *G04G 21/08* (2013.01); *G09G 5/10* (2013.01)

(58) Field of Classification Search
None
See application file for complete search history.

(56) References Cited

U.S. PATENT DOCUMENTS

2008/0049562 A1 2/2008 Andren
2016/0004367 A1 1/2016 Shimada
(Continued)

FOREIGN PATENT DOCUMENTS

CN 203882104 U 10/2014
CN 204856056 U 12/2015
(Continued)

OTHER PUBLICATIONS

Translation of EP3032360, Espacenet (Year: 2016).*
(Continued)

*Primary Examiner* — Renee S Luebke
*Assistant Examiner* — Matthew Daniel Hwang
(74) *Attorney, Agent, or Firm* — IPX PLLC (57) ABSTRACT

A control method and an electronic device are provided. The electronic device includes: a housing having an accommodating space, where the housing is provided with a recess around the accommodating space, and a first electrode and a second electrode are disposed on a bottom surface of the recess; and a bezel, where at least one part of the bezel is disposed in the recess. When the bezel is located at a first position of the recess, the first electrode and the second electrode are conductively connected; and when the bezel is located at a second position of the recess, the first electrode and the second electrode are conductively disconnected.

6 Claims, 5 Drawing Sheets

(51) Int. Cl.
*G04G 17/08* (2006.01)
*G04G 21/08* (2010.01)
*G09G 5/10* (2006.01)

(56) References Cited

U.S. PATENT DOCUMENTS

| | | | |
|---|---|---|---|
| 2016/0327916 | A1 | 11/2016 | Kim et al. |
| 2019/0271949 | A1* | 9/2019 | Kadmiri .................. G04B 37/22 |
| 2022/0191387 | A1* | 6/2022 | Zheng .................... H04N 23/51 |

FOREIGN PATENT DOCUMENTS

| | | |
|---|---|---|
| CN | 105677029 A | 6/2016 |
| CN | 206147524 U | 5/2017 |
| CN | 107003788 A | 8/2017 |
| CN | 108351616 A | 7/2018 |
| CN | 109634447 A | 4/2019 |
| CN | 110716417 A | 1/2020 |
| CN | 110716420 A | 1/2020 |
| CN | 111338203 A | 6/2020 |
| EP | 3032360 A1 * | 6/2016 ........... G04B 19/283 |
| JP | 2005017012 A | 1/2005 |
| KR | 102070054 B1 | 1/2020 |
| WO | 2016108537 A1 | 7/2016 |

OTHER PUBLICATIONS

Extended European Search Report issued in related European Application No. 21760042.8, mailed May 31, 2023, 8 pages.

Notice of Reasons for Refusal issued in related Japanese Application No. 2022-548212, mailed Aug. 8, 2023, 9 pages.

International Search Report issued in corresponding International Application No. PCT/CN2021/077436, mailed May 26, 2021, 8 pages.

First Office Action issued in related Chinese Application No. 202010124600.4, mailed Jan. 22, 2021, 10 pages.

Examination report issued in related India Application No. 202217049797, mailed Sep. 9, 2025, 5 pages.

* cited by examiner

ELECTRONIC DEVICE AND CONTROL METHOD

CROSS-REFERENCE TO RELATED APPLICATIONS

This application is a continuation of International Application No. PCT/CN2021/077436, filed on Feb. 23, 2021, which claims priority to Chinese Patent Application No. 202010124600.4, filed on Feb. 27, 2020. The entire contents of each of the above-identified applications are expressly incorporated herein by reference.

TECHNICAL FIELD

The present disclosure relates to the field of communication technologies, and in particular, to an electronic device and a control method.

BACKGROUND

At present, smartwatches have been widely used. In practical applications of smartwatches, to better improve the experience of human-computer interaction, a touch display screen is usually integrated on a smartwatch.

However, in practice, it is found that when a user directly operates the touch display screen with a finger, part of the display region of the touch display screen is easily blocked by the finger due to a small size of the touch display screen. As a result, the user cannot visually view the blocked part of the display region. For example, the first operation of using the smartwatch is an unlocking operation. When the user performs the unlocking operation on the touch display screen with a finger, part of the display region is easily blocked by the finger due to the small size of the touch display screen, often causing unlocking errors, requiring multiple inputs, resulting in complex operations, or easily exposing the user's privacy if the screen lock is not set.

SUMMARY

Embodiments of the present disclosure provide an electronic device and a control method.

According to a first aspect, an embodiment of the present disclosure provides an electronic device, including:
  a housing having an accommodating space, where the housing is provided with a recess around the accommodating space, and a first electrode and a second electrode are disposed on a bottom surface of the recess; and
  a bezel, where at least one part of the bezel is disposed in the recess, where
  when the bezel is located at a first position of the recess, the first electrode and the second electrode are conductively connected; and when the bezel is located at a second position of the recess, the first electrode and the second electrode are conductively disconnected.

According to a second aspect, an embodiment of the present disclosure further provides a control method for the foregoing electronic device, including:
  detecting a connection state of the first electrode and the second electrode in the electronic device, the connection state including conductive connection and conductive disconnection; and
  adjusting a state of the electronic device based on the detected connection state.

According to a third aspect, an embodiment of the present disclosure further provides a computer-readable storage medium, storing a computer program, where the computer program, when executed by a processor, implements the steps of the foregoing control method for the foregoing electronic device.

According to a fourth aspect, an embodiment of the present disclosure further provides a computer program product, stored in a computer-readable storage medium, where the computer program product, when executed by at least one processor, implements the steps of the foregoing control method for the foregoing electronic device.

According to a fifth aspect, an embodiment of the present disclosure further provides an apparatus, configured to perform the steps of the foregoing control method for the foregoing electronic device.

In this way, in the embodiments of the present disclosure, the position of the bezel can be adjusted, so that when the bezel is located at the first position of the recess, the first electrode and the second electrode are conductively connected, and when the bezel is located at the second position of the recess, the first electrode and the second electrode are conductively disconnected. In this way, the electronic device can implement corresponding functions by detecting the connection state of the first electrode and the second electrode, avoiding the problem of inconvenient operation caused by the operation on the display screen of the electronic device.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following will give a detailed description with reference to the accompanying drawings and specific embodiments.

Figure 1:
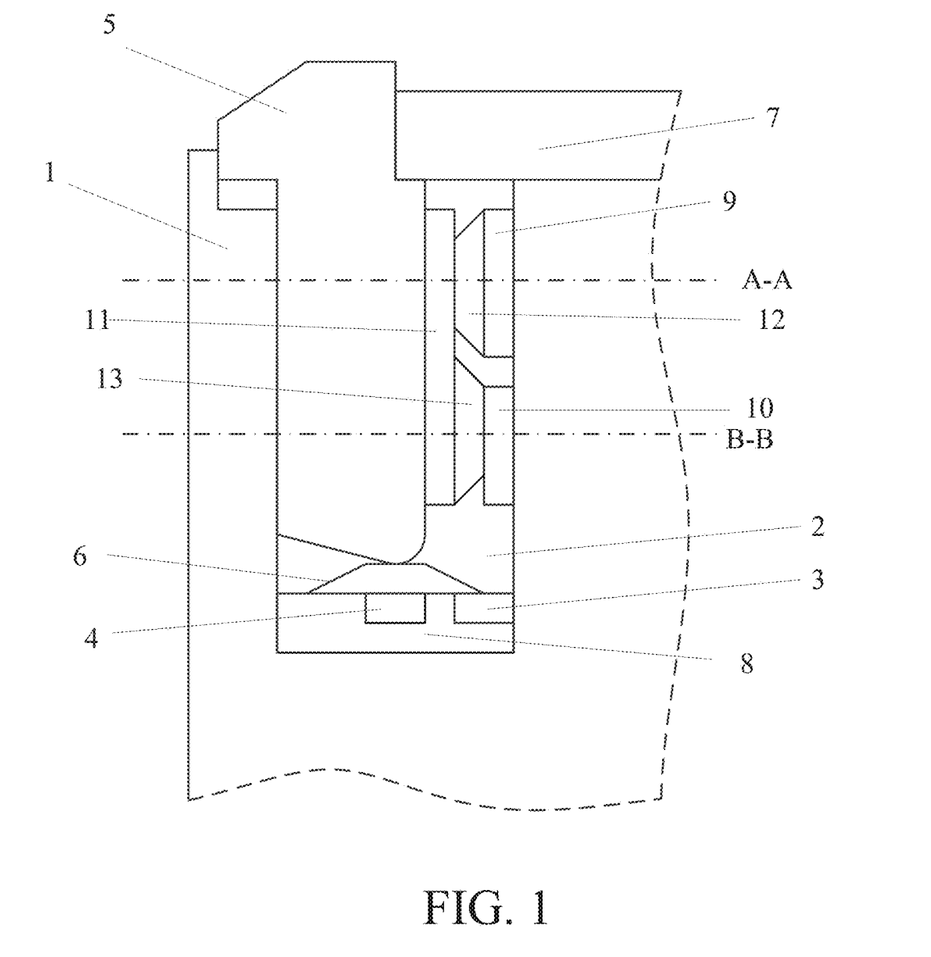
FIG. 1 is a schematic structural diagram 1 of an electronic device according to an embodiment of the present disclosure.
Figure 2:
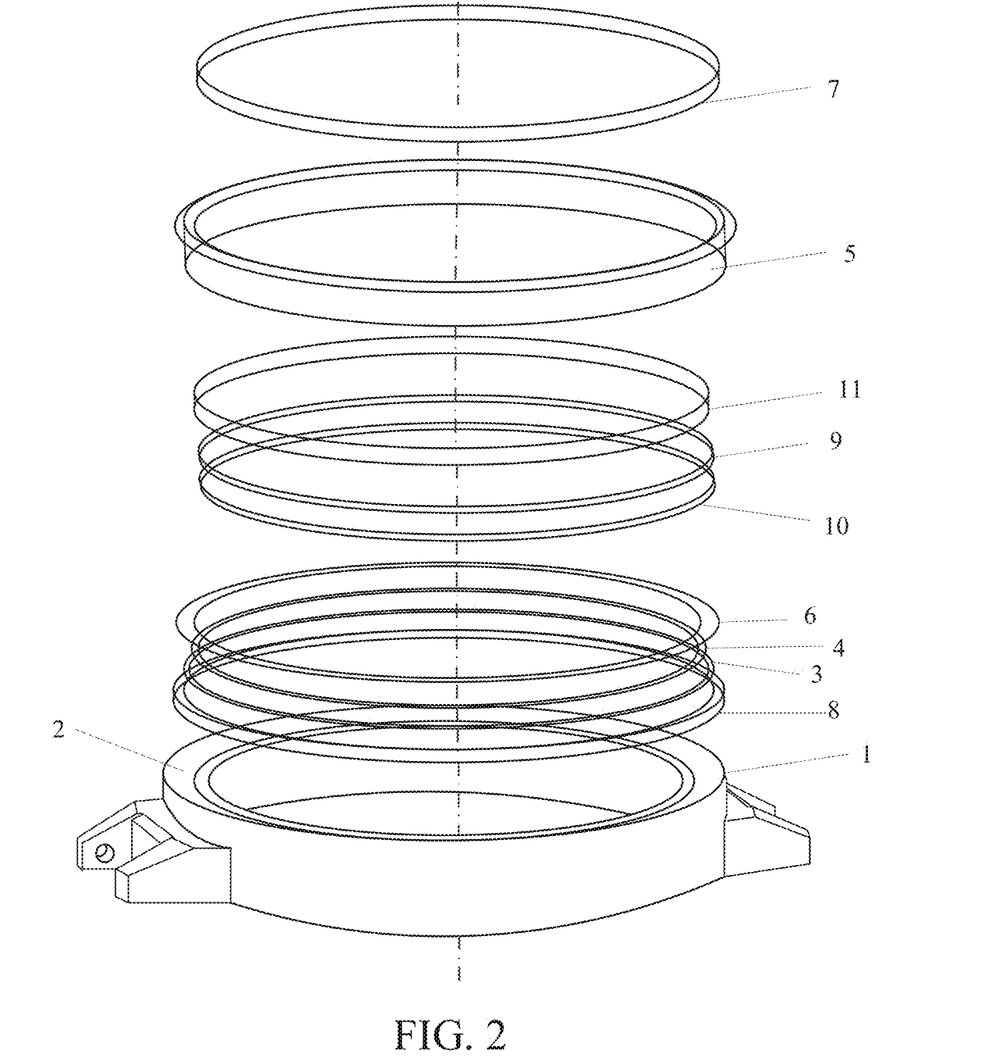
FIG. 2 is a schematic structural diagram 2 of an electronic device according to an embodiment of the present disclosure.

As shown in FIG. 1 and FIG. 2, an electronic device according to embodiments of the present disclosure includes:
  a housing 1 having an accommodating space, where the housing 1 is provided with a recess 2 around the accommodating space, and a first electrode 3 and a second electrode 4 are disposed on a bottom surface of the recess 2; and a bezel 5, where at least one part of the bezel 5 is disposed in the recess 2.

When the bezel 5 is located at a first position of the recess 2, the first electrode 3 and the second electrode 4 are conductively connected; and when the bezel 5 is located at a second position of the recess 2, the first electrode 3 and the second electrode 4 are conductively disconnected.

In this way, the user can adjust the position of the bezel 5 in the electronic device, so that when the bezel 5 is located at the first position of the recess 2, the first electrode 3 and the second electrode 4 on the bottom surface of the recess 2 are conductively connected; and when the bezel 5 is located at the second position of the recess 2 the first electrode 3 and the second electrode 4 are conductively disconnected. In this way, the electronic device can implement corresponding functions by detecting the connection state of conductive connection or conductive disconnection of the first electrode 3 and the second electrode 4, avoiding the problem of inconvenient operation caused by the operation on the display screen of the electronic device.

After detecting the connection state of the first electrode and the second electrode, in some embodiments, according to a first preset policy, when the connection state is conductive connection, the electronic device may be turned off or turned on; or, when the connection state is conductive disconnection, a target object is selected. In some embodiments, based on the connection state, the electronic device can further implement other functions, which are not listed one by one herein.

In this embodiment, for example, the electronic device further includes:

an elastic member 6, disposed on the bottom surface and having an end connected to the first electrode 3, where one end of the bezel 5 facing the bottom surface of the recess 2 is provided with a protruding portion; when the bezel 5 is located at the first position, the protruding portion presses the elastic member 6, and an other end of the elastic member 6 is connected to the second electrode 4; and when the bezel 5 is located at the second position, the protruding portion is away from the elastic member 6, and the other end of the elastic member 6 is separated from the second electrode 4.

In this way, when the bezel 5 is located at the first position, the protruding portion of the bezel 5 close to the bottom surface of the recess 2 presses the elastic member 6 to connect the elastic member 6 to the second electrode 4, thereby conductively connecting the first electrode 3 and the second electrode 4; and when the bezel 5 is located at the second position, as shown in FIG. 1, the protruding portion is away from the elastic member 6, and the elastic member 6 may return to its original state after being released from the pressing, and is separated from the second electrode 4, thereby disconnecting the first electrode 3 and the second electrode 4.

In some embodiments, the electronic device further includes: a display screen 7 disposed in the accommodating space, where the bezel 5 away from the bottom surface is provided with a first limit surface clamped to the housing 1 and a second limit surface clamped to the display screen 7.

In FIG. 1, the second limit surface is clamped to the display screen 7, so that the bezel 5 is at the second position. In this case, the first limit surface is separated from the housing 1. In some embodiments, pressing the bezel 5 downward may separate the second limit surface from a dial 7, the first limit surface is clamped to the housing 1, and the bezel 5 is at the first position.

It should be known that, in this embodiment, for example, the first electrode 3 and the second electrode 4 are disposed on the bottom surface through a carrier plate 8.

As shown in FIG. 2, the housing 1 is provided with a recess 2, and the recess 2 is an annular recess. Therefore, the first electrode 3 and the second electrode 4 are also annular electrodes, but have different radii. The first electrode 3 and the second electrode 4 are fixed in the carrier plate 8 and are disposed on the bottom surface of the recess 2 through the carrier plate 8.

In some embodiments, the elastic member 6 is a press elastic piece.

In this case, the elastic member 6 of the press elastic piece is shown in FIG. 1 and FIG. 2. An inner edge is fixedly connected to the first electrode 3, an outer edge is fixedly connected to the carrier plate 8, and a central raised position is just above the second electrode 4 and corresponds to the protruding portion of the bezel 5. The protruding portion of the bezel 5 presses the press elastic piece, and the press elastic piece is deformed and connected to the second electrode 4 to conductively connect the first electrode 3 and the second electrode 4.

In some embodiments, the first electrode 3 may also be two annular electrodes with different radii, respectively connected to edge portions on both sides of the elastic member 6.

In addition, in this embodiment, as shown in FIG. 1 and FIG. 2, for example, a sidewall of the recess 2 is provided with a first conductor 9 and a second conductor 10.

The bezel 5 is rotatable around an axial direction of the housing 1 in the recess 2.

In this way, the user can adjust an electrical signal between the first conductor 9 and the second conductor 10 by rotating the bezel 5, so that the electronic device can implement the corresponding functions by detecting the electrical signal, further avoiding the problem of inconvenient operation caused by the operation on the display screen of the electronic device.

In some embodiments, the first conductor 9 and the second conductor 10 are electrodes disposed at intervals on the same sidewall of the recess 2, and the part of the bezel 5 located in the recess 2 is provided with a resistor 11.

The first conductor 9 is provided with a first electrode bump 12 in contact with the bezel 5, and the resistor 11 is provided with a second electrode bump 13 in contact with the second conductor 10.

In some embodiments, the first conductor 9 is an annular conductor sleeved on an inner wall of the recess 2 and has a fixed position. The first electrode bump 12 on the first conductor 9 can come into contact with the resistor 11 disposed on the bezel 5. The second conductor 10 is an annular conductor sleeved on the inner wall of the recess 2 and has a fixed position. In some embodiments, the first conductor 9 and the second conductor 10 are located at different positions on the inner wall. The resistor 11 is an annular conductor provided with a notch and has a large resistance value. The resistor 11 is sleeved on the inner wall of the part of the bezel 5 located in the recess 2 and has a fixed position relative to the bezel 5. The second electrode bump 13 on the resistor 11 can come into contact with the second conductor 10. In some embodiments, in order to facilitate the rotation of the bezel 5, there is a predetermined amount of interference between the first electrode bump 12 and the resistor 11, and there is a predetermined amount of interference between the second electrode bump 13 and the second conductor 10.

Figure 3:
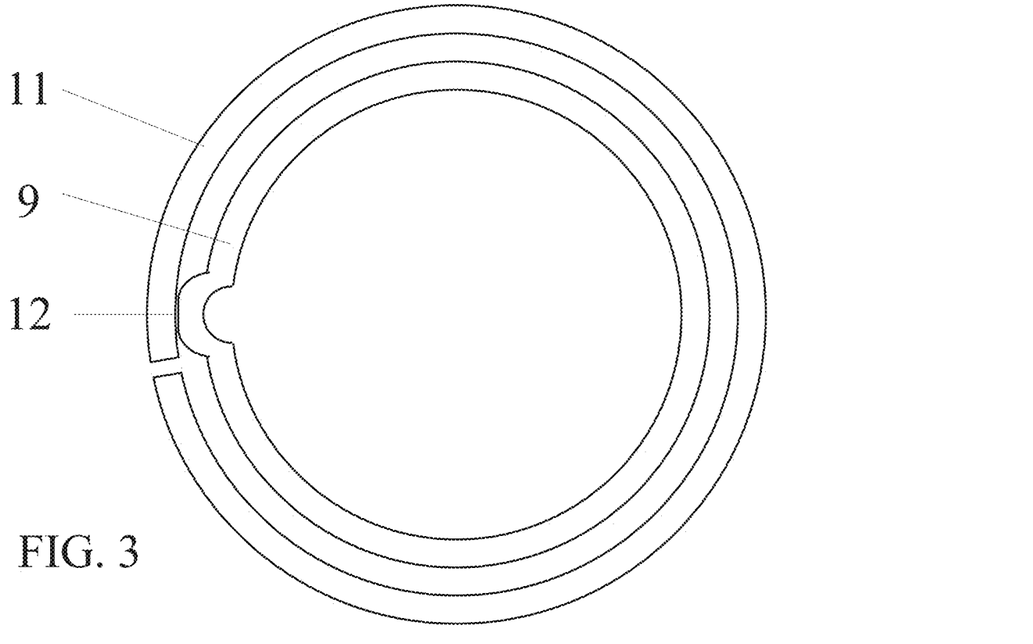
FIG. 3 is a sectional view of position A-A in FIG. 1.
Figure 4:
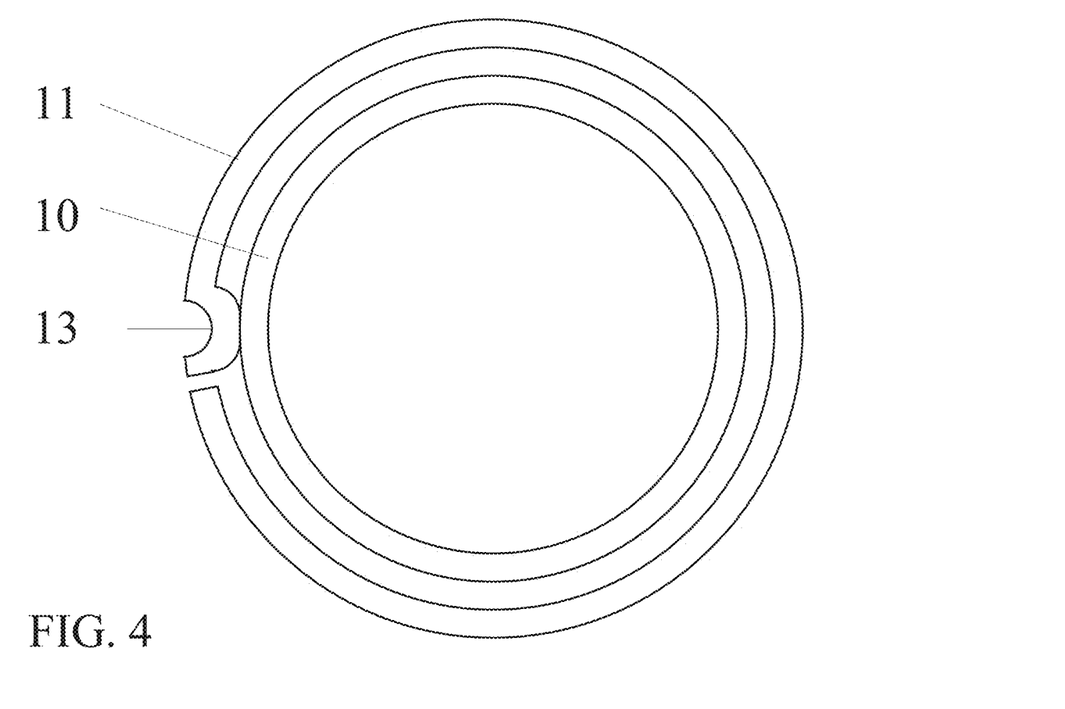
FIG. 4 is a sectional view of position B-B in FIG. 1.

In this way, when the bezel 5 rotates, the resistor 11 rotates with the bezel 5, and the second electrode bump 13 moves on the second conductor 10. As shown in FIG. 3, the first electrode bump 12 on the first conductor 9 is in contact with the resistor 11. As shown in FIG. 4, the second electrode bump 13 on the resistor 11 is in contact with the second conductor 10. In this way, relative positions of the first conductor 9 and the second conductor 10 change, and a resistance value between the first conductor 9 and the second conductor 10 changes with relative positions of the electrode bumps. The resistance value between the first conductor 9 and the second conductor 10 is a resistance value of the resistor chip between the first electrode bump 12 and the second electrode bump 13 (assuming that the resistor 11 has a large resistance value, a contact resistance value between the first electrode bump 12 and the resistor 11, a contact resistance value between the second electrode bump 13 and the second conductor 10, and a resistance value of the second conductor 10, and the like may not be considered).

Figure 5:
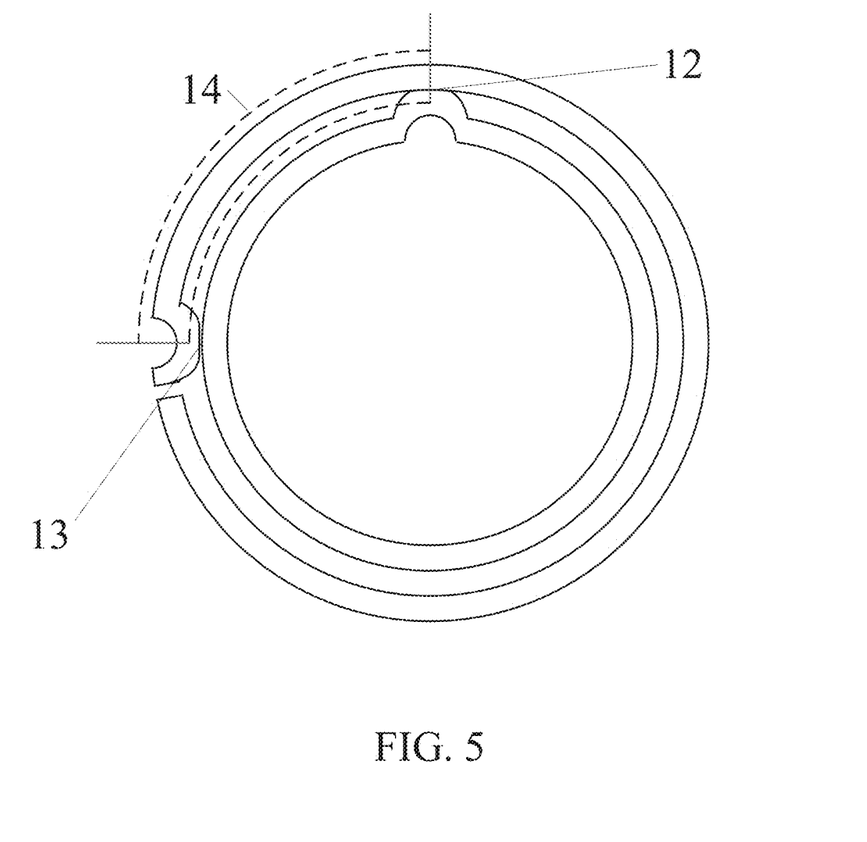
FIG. 5 is a schematic diagram illustrating a change in an electrical signal between a first conductor and a second conductor.

As shown in FIG. 5, an effective resistance region 14 of the resistor 11 is the dashed box part in the figure. In this case, a corresponding length of the effective resistance region 14 is a distance between the relative positions of the first conductor 9 and the second conductor 10, that is, an arc length L. Given that a resistivity per unit length of the resistor is r (a cross-sectional area of the resistor 11 is fixed), the relationship between L and the resistance value R between the first conductor 9 and the second conductor 10 may be obtained as $R = r \times L$. Therefore, as L changes, R also changes, and there are different electrical signals between the first conductor 9 and the second conductor 10. Further, by detecting the electrical signal, the electronic device can determine a target parameter corresponding to the current electrical signal and parameter configuration information according to a second preset policy, and adjust the target parameter of the electronic device based on the determined parameter configuration information. For example, if the second preset policy corresponds to adjusting the volume by rotating, according to the detected electrical signal, the target value of the volume corresponding to the current electrical signal can be determined, and then the volume is adjusted to the target value.

In this embodiment, the second preset policy may further correspond to adjusting the brightness by rotating, selecting an application, and the like, which are not listed one by one herein.

To sum up, in the electronic device according to the embodiments of the present disclosure, on one hand, the position of the bezel 5 in the recess 2 can be adjusted, to conductively connect or conductively disconnect the first electrode 3 and the second electrode 4 on the bottom surface of the recess 2; on the other hand, the bezel 5 can be rotated to adjust the electrical signal between the first conductor 9 and the second conductor 10. In this way, the electronic device can implement the corresponding functions by detecting the connection state of the first electrode 3 and the second electrode 4 and the electrical signal between the first conductor 9 and the second conductor 10, avoiding the problem of inconvenient operation caused by the operation on the display screen of the electronic device.

Figure 6:
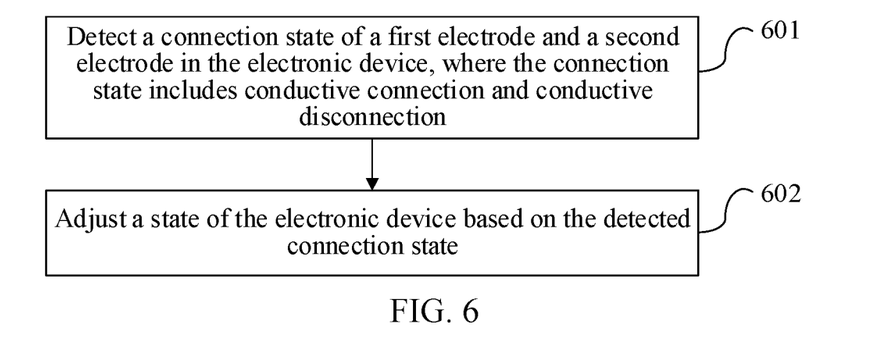
FIG. 6 is a schematic flowchart of a control method according to an embodiment of the present disclosure.

FIG. 6 shows a control method for the foregoing electronic device according to an embodiment of the present disclosure, including:

Step 601: Detect a connection state of the first electrode and the second electrode in the electronic device, the connection state including conductive connection and conductive disconnection.

In the foregoing embodiment, the bezel of the electronic device may be located at different positions of the recess, to conductively connect or conductively disconnect the first electrode and the second electrode on the bottom surface of the recess. Therefore, in this step, the connection state of the first electrode and the second electrode is detected first, to understand user needs, and then make targeted adjustments.

Step 602: Adjust a state of the electronic device based on the detected connection state.

In this step, after the detection in step 601, the state adjustment of the electronic device can be completed based on the detected connection state.

Through the foregoing steps 601 and 602, in the electronic device according to the embodiments of the present disclosure, the connection state of the first electrode and the second electrode caused by a position change of the bezel inside the recess may be detected, to adaptively adjust the state of the electronic device to meet user needs.

In some embodiments, step 602 includes:
according to a first preset policy, when the connection state is conductive connection, turning off or turning on the electronic device; or, when the connection state is conductive disconnection, selecting a target object.

In this way, based on the first preset policy, when it is detected that the connection state is conductive connection, the electronic device is turned off or turned on; or, the target object is selected. Herein, that the electronic device is turned off or turned on is correspondingly processed based on whether it is currently on or off. The target object may be an object currently displayed or selected by frame selection.

In addition, it can be known from the foregoing embodiments of the electronic device that, in the electronic device, an electrical signal between the first conductor and the second conductor can be adjusted by rotating the bezel. Therefore, In some embodiments, the method further includes:
detecting the electrical signal between the first conductor and the second conductor in the electronic device; and
adjusting the state of the electronic device based on the detected electrical signal.

In this way, the electronic device in the embodiments of the present disclosure may detect the electrical signal triggered between the first conductor and the second conductor caused by the rotation of the bezel inside the recess, adaptively adjusting the state of the electronic device to meet user needs.

In some embodiments, the adjusting the state of the electronic device based on the detected electrical signal includes:
determining a target parameter corresponding to the current electrical signal and parameter configuration information according to a second preset policy, and adjusting the target parameter based on the parameter configuration information. In this way, for the detected electrical signal, the electronic device can determine the target parameter corresponding to the current electrical signal and the parameter configuration information according to the second preset policy, and adjust the target parameter of the electronic device based on the determined parameter configuration information.

In some embodiments, the second preset policy includes at least one of the following:

a value of a volume corresponding to the electrical signal when the connection state is conductive disconnection; or a value of a luminance corresponding to the electrical signal when the connection state is conductive disconnection.

Therefore, through the second preset policy, when the connection state is conductive disconnection, the target parameter can be adjusted by rotating the bezel, and the target parameter is: the volume of the electronic device and the brightness of the display screen. In some embodiments, the parameter configuration information of the target parameter (that is, the adjustment target value) can be obtained from a value corresponding to the electrical signal in the second preset policy.

In this embodiment, the second preset policy may also be used to select an application, select a contact, and the like by rotating, which is not described in detail herein.

To sum up, in the method according to the embodiments of the present disclosure, on one hand, the position of the bezel can be adjusted based on the structure of the electronic device, to conductively connect or conductively disconnect the first electrode and the second electrode on the bottom surface of the recess; on the other hand, the bezel can be rotated to adjust the electrical signal between the first conductor and the second conductor. Therefore, the electronic device can implement corresponding functions by detecting the connection state of the first electrode and the second electrode and the electrical signal between the first conductor and the second conductor, avoiding the problem of inconvenient operation caused by the operation on the display screen of the electronic device.

Figure 7:
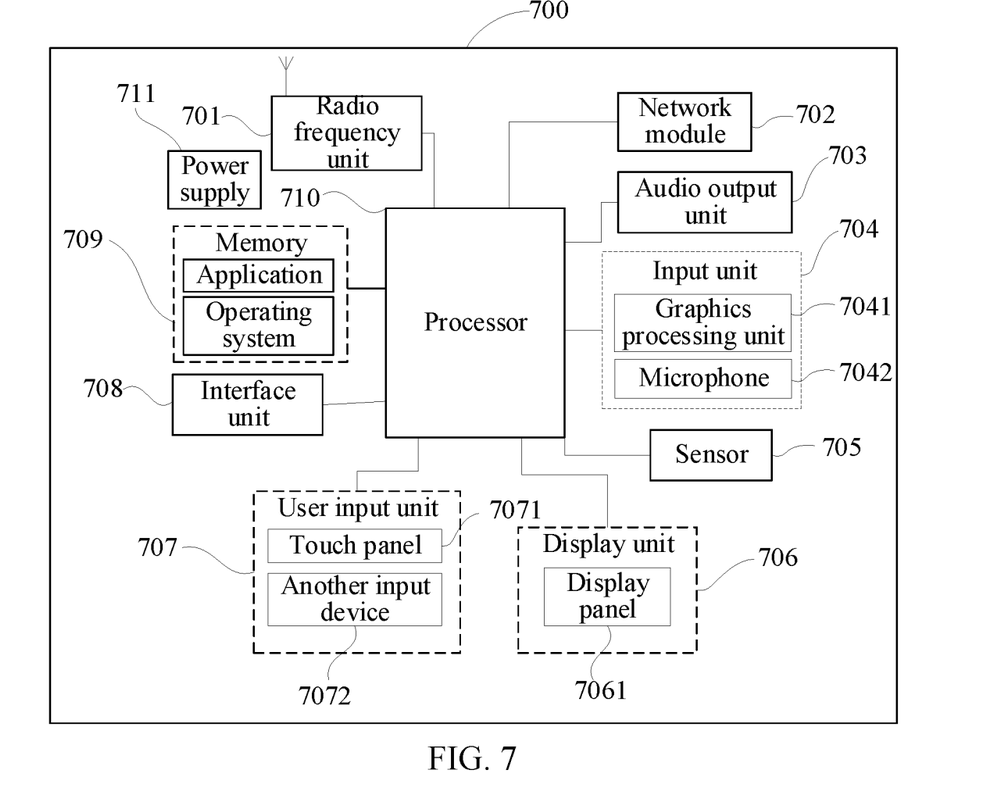
FIG. 7 is a schematic structural diagram of an electronic device according to an embodiment of the present disclosure.

FIG. 7 is a schematic diagram of a hardware structure of an electronic device according to the embodiments of the present disclosure. The electronic device 700 includes, but is not limited to, components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the electronic device shown in FIG. 7 constitutes no limitation on the electronic device, and the electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a handheld computer, an in-vehicle terminal, a wearable device, a pedometer, and the like.

The processor 710 is configured to detect a connection state of the first electrode and the second electrode in the electronic device, where the connection state includes conductive connection and conductive disconnection;

adjusting a state of the electronic device based on the detected connection state.

It can be seen that the position of the bezel can be adjusted based on the structure of the electronic device, to conductively connect or conductively disconnect the first electrode and the second electrode on the bottom surface of the recess. Therefore, the electronic device can implement the corresponding functions by detecting the connection state of the first electrode and the second electrode, avoiding the problem of inconvenient operation caused by the operation on the display screen of the electronic device.

It should be understood that, in the embodiments of the present disclosure, the radio frequency unit 701 may be configured to receive and send a signal during an information receiving and sending process or a call process. In some embodiments, the radio frequency unit receives downlink data from a base station, then delivers the downlink data to the processor 710 for processing, and sends related uplink data to the base station. Generally, the radio frequency unit 701 includes, but is not limited to, an antenna, at least one amplifier, a transceiver, a coupler, a low noise amplifier, a duplexer, and the like. In addition, the radio frequency unit 701 may further communicate with another device through a wireless communication system and network.

The electronic device provides wireless broadband Internet access for a user by using the network module 702, such as helping the user to send and receive emails, browse web pages, and access streaming media.

The audio output unit 703 may convert audio data received by the radio frequency unit 701 or the network module 702 or stored in the memory 709 into an audio signal and output the audio signal as sound. In addition, the audio output unit 703 may further provide an audio output related to a particular function executed by the electronic device 700 (for example, a call signal receiving sound or a message receiving sound). The audio output unit 703 includes a speaker, a buzzer, a receiver, and the like.

The input unit 704 is configured to receive an audio or video signal. The input unit 704 may include a Graphics Processing Unit (GPU) 7041 and a microphone 7042. The graphics processing unit 7041 performs processing on image data of a static picture or a video obtained by an image acquisition device (for example, a camera) in a video acquisition mode or an image acquisition mode. The processed image frame may be displayed on the display unit 706. An image frame that has been processed by the graphics processing unit 7041 may be stored in the memory 709 (or another storage medium) or sent by using the radio frequency unit 701 or the network module 702. The microphone 7042 can receive sounds and can process such sounds as audio data. The processed audio data may be converted, in a phone call mode, into a format output that can be sent by the radio frequency unit 701 to a mobile communication base station.

The electronic device 700 may further include at least one sensor 705, such as an optical sensor, a motion sensor, and other sensors. In some embodiments, the optical sensor includes an ambient light sensor and a proximity sensor, where the ambient light sensor may adjust luminance of the display panel 7061 according to the luminance of the ambient light, and the proximity sensor may switch off the display panel 7061 and/or backlight when the electronic device 700 is moved to the ear. As one type of motion sensor, an accelerometer sensor may detect magnitudes of accelerations in various directions (generally, on three axes), may detect a magnitude and a direction of the gravity when static, and may be applied to recognizing the attitude of the electronic device (for example, switching between landscape orientation and portrait orientation, a related game, and magnetometer attitude calibration), a function related to vibration recognition (such as a pedometer and a knock), and the like; the sensor 705 may also include a fingerprint sensor, a pressure sensor, an iris sensor, a molecular sensor, a gyroscope, a barometer, a hygrometer, a thermometer, an infrared sensor, and the like, which is not described in detail herein.

The display unit 706 is configured to display information inputted by the user or information provided for the user. The display unit 706 may include a display panel 7061. The display panel 7061 may be configured by using a Liquid Crystal Display (LCD), an Organic Light-Emitting Diode (OLED), or the like.

The user input unit 707 may be configured to receive input digit or character information, and generate key signal input related to the user setting and function control of the electronic device. In some embodiments, the user input unit 707 includes a touch panel 7071 and another input device 7072. The touch panel 7071, also referred to as a touch-screen, may collect a touch operation of a user on or near the touch panel (such as an operation of a user on the touch panel 7071 or near the touch panel 7071 by using any suitable object or attachment, such as a finger or a stylus). The touch panel 7071 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 710. In addition, the touch controller receives a command transmitted by the processor 710 and executes the command. In addition, the touch panel 7071 may be implemented by using various types, such as a resistive type, a capacitive type, an infrared type, and a surface acoustic wave type. In addition to the touch panel 7071, the user input unit 707 may further include the another input device 7072. In some embodiments, the another input device 7072 may include, but is not limited to, a physical keyboard, a functional key (such as a volume control key or a switch key), a track ball, a mouse, and a joystick, which are not described in detail herein.

Further, the touch panel 7071 may cover the display panel 7061. After detecting a touch operation on or near the touch panel, the touch panel 7071 transfers the touch operation to the processor 710, to determine a type of a touch event. Then, the processor 710 provides a corresponding visual output on the display panel 7061 according to the type of the touch event. In FIG. 7, the touch panel 7071 and the display panel 7061 are used as two separate parts to implement input and output functions of the electronic device. However, in some embodiments, the touch panel 7071 and the display panel 7061 may be integrated to implement the input and output functions of the electronic device, which is not specifically limited herein.

The interface unit 708 is an interface for connecting an external apparatus and the electronic device 700. For example, the external apparatus may include a wired or wireless headset port, an external power supply (or battery charger) port, a wired or wireless data port, a memory card port, a port for connecting an apparatus with a recognition module, an audio Input/Output (I/O) port, a video I/O port, a headphone port, and the like. The interface unit 708 may be configured to receive an input (such as data information or electric power) from an external apparatus and transmit the received input to one or more elements in the electronic device 700 or may be configured to transmit data between the electronic device 700 and the external apparatus.

The memory 709 may be configured to store a software program and various data. The memory 709 may mainly include a program storage area and a data storage area. The program storage area may store an operating system, an application program required by at least one function (such as a sound playback function and an image display function), and the like; The data storage area may store data created according to the use of the mobile phone (such as audio data, phone book), and the like. In addition, the memory 709 may include a high-speed random access memory, and may further include a non-volatile memory, such as at least one magnetic disk storage device, a flash memory or another volatile solid-state storage device.

The processor 710 is a control center of the electronic device, and is connected to various parts of the electronic device by using various interfaces and lines. By running or executing the software program and/or module stored in the memory 709, and invoking data stored in the memory 709, the processor performs various functions and data processing of the electronic device, thereby performing overall monitoring on the electronic device. The processor 710 may include one or more processing units. In some embodiments, the processor 710 may integrate an application processor and a modem processor. The application processor mainly processes an operating system, a user interface, an application program, and the like. The modem processor mainly processes wireless communication. It may be understood that the foregoing modem processor may not be integrated into the processor 710.

The electronic device 700 may further include the power supply 711 (such as a battery) for supplying power to the components. In some embodiments, the power supply 711 may be logically connected to the processor 710 by a power management system, thereby implementing functions such as charging, discharging, and power consumption management by using the power management system.

In addition, the electronic device 700 includes some unshown functional modules, which are not described in detail herein.

The embodiments of the present disclosure further provide a computer-readable storage medium, storing a computer program, where when executed by a processor, the computer program implements the processes of the embodiment of the control method for the foregoing electronic device, and can achieve the same technical effects. To avoid repetition, details are not described herein again. The computer-readable storage medium is, for example, a Read-Only Memory (ROM), a Random Access Memory (RAM), a magnetic disk, an optical disc or the like.

It should be noted that the terms "include", "comprise", or any other variation thereof in this specification is intended to cover a non-exclusive inclusion, making a process, method, article or apparatus including a series of elements include not only those elements, but also other elements not expressly listed, or further elements inherent to such process, method, article or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and in some embodiments, may also be implemented by hardware, but in many cases, the former manner is a better implementation. Based on such understanding, the technical solutions of the present disclosure or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner a network device, or the like) to perform the methods in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art may make many forms without departing from the idea of the present disclosure and the scope of protection of the claims. All of the forms fall within the protection of the present disclosure.

What is claimed is:

1. An electronic device, comprising:
   a housing having an accommodating space, where the housing is provided with a recess around the accommodating space, and a first electrode and a second electrode are disposed on a bottom surface of the recess;
   a bezel, where at least one part of the bezel is disposed in the recess, wherein when the bezel is located at a first position of the recess, the first electrode and the second electrode are conductively connected; and when the bezel is located at a second position of the recess, the first electrode and the second electrode are conductively disconnected; and
   an elastic member disposed on the bottom surface and having a first end connected to the first electrode,
   wherein one end of the bezel facing the bottom surface of the recess is provided with a protruding portion; when the bezel is located at the first position, the protruding portion presses the elastic member, and a second end of the elastic member is connected to the second electrode; and when the bezel is located at the second position, the protruding portion is away from the elastic member, and the second end of the elastic member is separated from the second electrode.

2. The electronic device according to claim 1, further comprising: a display screen disposed in the accommodating space, wherein
   the bezel away from the bottom surface is provided with a first limit surface clamped to the housing and a second limit surface clamped to the display screen.

3. The electronic device according to claim 1, wherein a sidewall of the recess is provided with a first conductor and a second conductor; and
   the bezel is rotatable around an axial direction of the housing in the recess.

4. The electronic device according to claim 3, wherein the first conductor and the second conductor are electrodes disposed at intervals on the same sidewall of the recess, and the part of the bezel located in the recess is provided with a resistor; and
   the first conductor is provided with a first electrode bump in contact with the bezel, and the resistor is provided with a second electrode bump in contact with the second conductor.

5. The electronic device according to claim 1, wherein the first electrode and the second electrode are disposed on the bottom surface through a carrier plate.

6. The electronic device according to claim 1, wherein the elastic member is a press elastic piece.

* * * * *